Patented Aug. 10, 1954

2,686,010

UNITED STATES PATENT OFFICE 2,686,010

PROCESS FOR THE MANUFACTURE OF β-PHTHALOCYANINES IN A DISPERSIBLE FORM

Walter Wettstein, Riehen, Switzerland, assignor to Ciba Limited, Basel, Switzerland No Drawing. Application September 17, 1951, Serial No. 247,016

Claims priority, application Switzerland September 25, 1950

3 Claims. (Cl. 241—22)

Among the large number of known phthalocyanine dyestuffs only a few have attained commercial importance. In commerce there are available principally copper phthalocyanine and metal-free phthalocyanine and a few derivatives thereof.

As is known, in the synthesis of phthalocyanines whether they are prepared from phthalonitrile or orthodihalogen-benzenes by treatment with compounds yielding metal, they are first of all obtained in a crystalline form which on account of its grain size is useless as a pigment dyestuff even after grinding in grinding appliances known at the present time.

The usual method for converting the crude dyestuff so obtained into a useful pigment dyestuff consists in suspending or dissolving the crude dyestuff in sulfuric acid and then re-precipitating the dyestuff by pouring the mixture into water. In this process a polymorphic conversion takes place, whereby the original, so-called β-modification having a characteristic X-ray diagram is converted into the so-called α-modification, which has a typically different X-ray diagram. In this manner the covering power or dyeing power of the dyestuff is very considerably increased. In the case of copper phthalocyanine there has been described another method of working up the crude dyestuff, which consists in grinding the crude dyestuff in the dry state with a substratum which is capable of being removed after grinding. In this method there is also a polymorphic conversion of the dyestuff into the α-modification. It has therefore been concluded that only the α-modification is useful as a pigment dyestuff (cf. FIAT Final Report 1313, vol. III, pages 446 and 447).

The present invention is based on the unexpected observation that metal-free β-phthalocyanine and metalliferous β-phthalocyanines, which are derived from a metal having an atomic weight below 65, can be produced in a dispersible form from the corresponding crude phthalocyanines by grinding the latter with a water-soluble grinding substratum, if the grinding is carried out with anhydrous sodium ferrocyanide or anhydrous barium chloride at a temperature within the range of 100 to 150° until the color strength of the ground material no longer substantially increases, and then the grinding substratum is removed by treatment with water. The resulting moist pigment may then be dried. It is an extremely valuable pigment dyestuff, which is distinguished from the starting material in that it is in a dispersible form, that is to say, in a form which can be converted into a fine dispersion by simple mechanical treatment, for example, by grinding in an ordinary mill.

In view of the fact that all previous attempts to convert crude phthalocyanines into useful pigments by grinding in the usual grinding appliances hitherto known have been unsuccessful, and especially as the known analogous method, referred to above, of grinding copper phthalocyanine with the aid of substrata in the cold leads to the α-modification, which can only be converted slowly into the β-modification by heating at 200° C. (loc. cit. page 447), it could not be foreseen that the process of the present invention would be successful. The β-phthalocyanines obtainable in accordance with the invention, with respect to their dyeing power are comparable with the known commercial products consisting mainly or exclusively of the α-modification and obtained either by the known method of reprecipitation from sulfuric acid or by grinding in the cold with a substratum. The tint of the blue pigments obtainable in accordance with the invention is however, distinctly shifted towards green. They therefore represent a valuable contribution to the art. The known blue commercial products in the α-form have a reddish tinge which is lacking in the pigments of the β-form obtained by the present process. This difference is essentially important for the production of green pigments by admixture with yellow pigments. The known blue commercial products, when so mixed, produce slightly olive-green tints, whereas the blue β-phthalocyanines of the present invention, owing to the absence of the reddish tinge of the usual commercial blue α-phthalocyanines, yield green tints.

As starting materials there are used metal-free crude phthalocyanine or metalliferous crude phthalocyanines which are derived from a metal having an atomic weight below 65. Such metalliferous crude phthalocyanines are, for example, those of nickel, cobalt, iron and preferably copper. As starting materials there may also be used derivatives of crude phthalocyanines, for example, halogenated and especially chlorinated crude phthalocyanines which contain 8–16 chlorine atoms in the molecule.

As stated above, the grinding is carried out at a temperature within the range of 100° C.–150° C., and advantageously 120° C.–140° C.

The ratio of crude phthalocyanine to the grinding substratum may vary within wide limits. The substrata are advantageously used in proportions which are 1 to 5 times, and advantageously 2 to 3 times the quantity of the dyestuff.

The pigments of the invention are excellently suited for colouring lacquers of cellulose esters or other lacquer bases, natural or artificial resins, natural or artificial rubber, polymerisation products, viscose or cellulose esters in the mass, etc., and also for textile printing and for wallpapers and lithographic colours and the like.

The following examples illustrate the invention, the parts and percentages being by weight unless otherwise stated and the relationship of parts by weight to parts by volume being the same as that of the gram to the cubic centimeter:

*Example 1*

25 parts of crude copper phthalocyanine are ground with 75 parts of anhydrous sodium ferrocyanide in a closed rod mill at 126° C. until the color strength of the ground material does no longer substantially increase which, with the grinding equipment used, is achieved in the course of about 21 hours. The ground mixture is suspended in 1000 parts by volume of water or of sodium chloride solution of 20 per cent. strength, and heated to about 70° C. The ground pigment is separated by filtration and washed with water. The resulting aqueous paste may, if desired, be dried. The grinding substratum may be isolated from the filtrate in the form of $Na_4[Fe(CN)_6] \cdot 10H_2O$ by stirring in the cold, and dehydrated in known manner.

*Example 2*

25 parts of metal-free crude phthalocyanine are ground with 75 parts of anhydrous barium chloride in a closed rod mill at 140° C. until the color strength of the ground material does no longer substantially increase which, with the grinding equipment used, is achieved in the course of about 22 hours. The ground mixture is suspended in 1000 parts by volume of a cold saturated solution of barium chloride, and the mixture is heated to 80° C. while stirring, filtered while hot, and the filter residue is washed with hot water. If desired, the resulting aqueous paste may be dried. The barium chloride can be isolated from the filtrate by stirring in the cold, and dehydrated in known manner.

What is claimed is:

1. In the manufacture of a β-phthalocyanine in a dispersible form, the β-phthalocyanine being a member selected from the group consisting of a metal-free β-phthalocyanine and a metalliferous β-phthalocyanine, which latter derives from a metal having an atomic weight below 65, by grinding the corresponding crude phthalocyanine with a water-soluble grinding substratum until the color strength of the ground material no longer substantially increases and thereupon removing the grinding substratum by washing out with water, the improvement which consists in effecting the grinding with a salt selected from the group consisting of anhydrous sodium ferrocyanide and anhydrous barium chloride as grinding substratum at a temperature within the range of 120 to 140° C., the salt: pigment ratio being from about 2:1 to about 3:1.

2. In the manufacture of a β-phthalocyanine in a dispersible form, the β-phthalocyanine being a member selected from the group consisting of a metal-free β-phthalocyanine and a metalliferous β-phthalocyanine, which latter derives from a metal having an atomic weight below 65, by grinding the corresponding crude phthalocyanine with a water-soluble grinding substratum until the color strength of the ground material no longer substantially increases and thereupon removing the grinding substratum by washing out with water, the improvement which consists in effecting the grinding with anhydrous sodium ferrocyanide as grinding substratum at about 126° C., the salt: pigment ratio being about 3:1.

3. In the manufacture of a β-phthalocyanine in a dispersible form, the β-phthalocyanine being a member selected from the group consisting of a metal-free β-phthalocyanine and a metalliferous β-phthalocyanine, which latter derives from a metal having an atomic weight below 65, by grinding the corresponding crude phthalocyanine with a water-soluble grinding substratum until the color strength of the ground material no longer substantially increases and thereupon removing the grinding substratum by washing out with water, the improvement which consists in effecting the grinding with anhydrous barium chloride as grinding substratum at about 140° C., the salt: pigment ratio being about 3:1.

References Cited in the file of this patent

UNITED STATES PATENTS

| Number | Name | Date |
| --- | --- | --- |
| 2,402,167 | Lang | June 18, 1946 |

FOREIGN PATENTS

| Number | Country | Date |
| --- | --- | --- |
| 569,402 | Great Britain | May 22, 1945 |